United States Patent [19]

Singh et al.

[11] Patent Number: 4,777,009
[45] Date of Patent: Oct. 11, 1988

[54] AUTOMATIC STEAM GENERATOR FEEDWATER CONTROL OVER FULL POWER RANGE

[75] Inventors: Gurdip Singh, Vernon; Charles T. French, Windsor, both of Conn.

[73] Assignee: Combustion Engineering, Inc., Windsor, Conn.

[21] Appl. No.: 879,893

[22] Filed: Jun. 30, 1986

[51] Int. Cl.[4] .............................................. G21C 7/32
[52] U.S. Cl. .................................... 376/211; 376/216; 60/607
[58] Field of Search ................... 60/667; 376/210, 211, 376/215, 216, 217, 241, 297

[56] References Cited

U.S. PATENT DOCUMENTS

| | | | |
|---|---|---|---|
| 3,255,084 | 6/1966 | Doroszlai | 376/216 |
| 4,064,698 | 12/1977 | Stern | 60/667 |
| 4,064,699 | 12/1977 | Martz | 60/667 |
| 4,075,059 | 2/1978 | Bruno et al. | 376/217 |
| 4,104,117 | 8/1978 | Parzigle et al. | 376/211 |
| 4,187,144 | 2/1980 | Mueller et al. | 376/216 |
| 4,424,186 | 1/1984 | Cook | 376/241 |

OTHER PUBLICATIONS

G. Singh, Microprocessor System for Low Power Feedwater Control, 4/9–4/12/85, pp. 1–7.

Primary Examiner—Deborah L. Kyle
Assistant Examiner—Richard L. Klein
Attorney, Agent, or Firm—Chilton, Alix & Van Kirk

[57] ABSTRACT

A water level control for a steam generator of a pressurized water type of nuclear steam supply system varies the water level demand as a function of power. The control also varies the water feed rate after a reactor trip initially as a function of reactor coolant average temperature.

17 Claims, 9 Drawing Sheets

AUTOMATIC STEAM GENERATOR FEEDWATER CONTROL OVER FULL POWER RANGE

BACKGROUND OF THE INVENTION

1. Field of the Invention

This invention relates to nuclear power and particularly to the control of recirculating steam generators in pressurized water nuclear steam supply systems (NSSS). More specifically, the present invention is directed to automatic water level controls for steam generators of nuclear power systems. Accordingly, the general objects of the present invention are to provide novel and improved methods and apparatus of such character.

2. Description of the Prior Art

The nuclear steam generator of a pressurized water nuclear power plant is typically controlled as a function of three primary operating parameters which are monitored, i.e., water level (L) steam flow ($W_S$) and feedwater flow $W_{fw}$). The signals corresponding to the monitored parameters are processed in proportional/integral and lead/lag circuits to generate a feedwater flow demand signal for controlling the amount of water introduced into the steam generator for the production of steam. The principal concern, and therefore the operating parameter on which the control action is primarily based, is the steam generator water level.

In practice, the control of the steam generators of NSSS has proven to be an unusually difficult task. As a result, a significant proportion of major nuclear power plant outages have been caused by reactor trips due to steam generator operation outside the desired range. Many of these outages are due to reactor trips on low or high steam generator water levels. Typically, about 80 percent of steam generator low water level trips occur below 20 percent system rated power, and nearly 90 percent of the high water level trips occur below 20 percent power. The problem of maintaining steam generator water level within proper limits is particularly acute during plant startup, when the operators have had relatively little experience in steam generator water level control.

A major complexity incident to steam generator control, particularly at low power levels, resides in the water recirculation characteristics of the system including the steam generator. Thus, during low power operation, the sensitivity of the steam generator water level to changes in feedwater flow increases. Also, at low power there is a seemingly anomalous behavioral characteristic which is manifested by an initial decrease in steam generator water level when there is an increase in the feedwater flow. This behaviour often confuses the operator, and usually causes the operator to further increase the feedwater flow, causing a further decrease in the water level and introducing "positive feedback" into the system which may lead to uncontrolled oscillation of the water level and to a reactor trip.

Conventional controllers, even of the above-mentioned three parameter type, are unreliable at low power operation because the steam flow and feedwater flow signals are themselves not reliable under such operating conditions. In most instances, because of this known lack of reliability, the operators elect to manually control the water level. Attempts at manual control have met with only limited success to date.

SUMMARY OF THE INVENTION

It is thus an object of the present invention to provide a control technique for a recirculating steam generator in a nuclear steam supply system and particularly a method which is capable of automatic water level control over the full power operating range of the steam supply system.

In accordance with the invention, there is provided a control system and a method of control for a recirculating nuclear steam generator that takes into account the power related variations in the dynamic characteristics of the steam generator.

Thus, the present invention automatically controls the feedwater flow rate to a steam generator to maintain satisfactory downcomer water level during steady-state operation and during the following load maneuvers:

(a) 10 percent steps in NSSS load between 15 percent and 100 percent NSSS power.
(b) 1 percent/minute ramps in NSSS load between 0 percent and 15 percent NSSS power and 5 percent/minute ramps in NSSS load between 15 percent and 100 percent NSSS power.
(c) Load rejections of any magnitude.

The present invention also provides for automatic operation in the event of the following plant conditions:

(a) Reactor trip
(b) Loss of a Feedwater Pump during two feedwater pump operation.
(c) High steam generator downcomer water level.

In accomplishing the foregoing, the present invention automatically opens and closes, in a sequential manner, the downcomer and economizer feedwater control valves. Additionally, the invention coordinates the adjustment of the economizer feedwater control valve, the downcomer feedwater control valve and main feedwater pump speed setpoint to automatically regulate the feedwater flow between 0 percent and 100 percent NSSS power to control the steam generator water level.

In accordance with a preferred embodiment, the invention regulates the feedwater flow rate to control the steam generator downcomer, i.e., steam generator, water level after a reactor trip by sensing the $T_{AVG}$ signal from the associated primary coolant loop. This action minimizes the possibility of overcooling the primary coolant loop after a reactor trip. The system automatically returns to the low power level control mode when steam generator water level returns to its setpoint.

A control system in accordance with the invention is configured to minimize the necessity for separate adjustments by the operator during manual operation of the feedwater pump speed setpoint and the feedwater control valves. This minimizes operator actions and thus minimizes possible operator error.

A particularly unique feature of the invention is its ability to position the feedwater control valves as a function of power speed such that at low flow rates feedwater flow is predominantly regulated by valves while pump speed control is the primary mechanism for feedwater flow adjustment at high flow rates.

In the practice of the invention, a signal commensurate with the measured steam generator water level is passed through a lead-lag circuit. The lead improves the control responsiveness and compensates for the delays in the steam generator process, while the lag improves the steady state response and the stability margin. The lead and lag settings are automatically varied with power level to compensate for the dynamic characteristics of the steam generator. The thus processed water level signal is then passed through a proportional-integral controller, where the gain and reset rate are also adjusted as a function of power to further compensate for the steam generator dynamic characteristics.

BRIEF DESCRIPTION OF THE DRAWINGS

The preferred embodiment of the invention will be described below with reference to the accompanying drawing wherein like reference numerals refer to like elements in the several figures and in which.

DESCRIPTION OF THE PREFERRED EMBODIMENT

Figure 1:
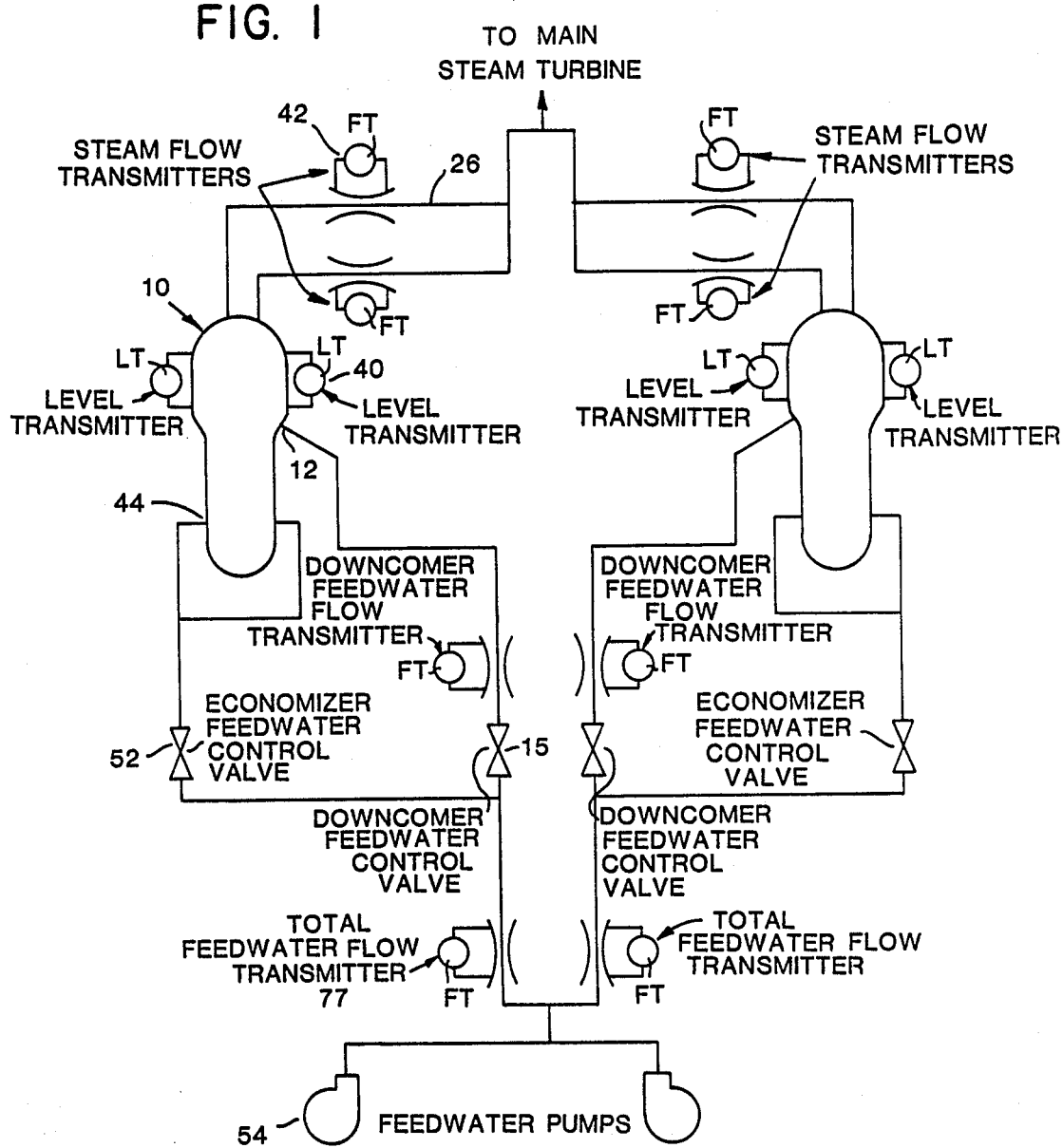
FIG. 1 is a schematic partial showing of the basic feedwater flow path in a NSSS employing two steam generators.
Figure 2:
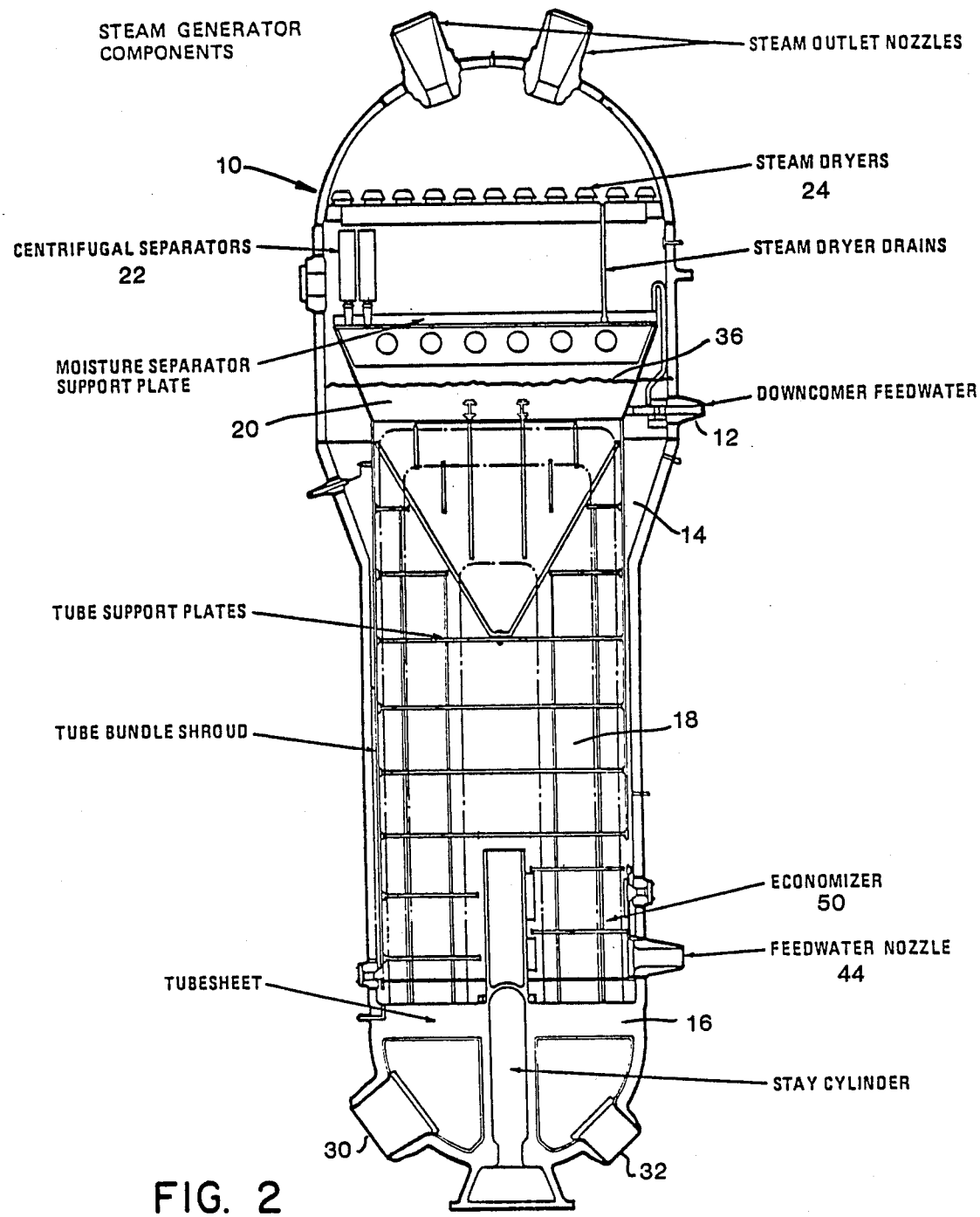
FIG. 2 is a schematic view of a recirculating nuclear steam generator.

FIG. 1 is a schematic illustration of a typical recirculating steam generator installation in a NSSS while FIG. 2 schematically shows a single steam generator 10. Feedwater is, under certain operating conditions, delivered to the generator via the downcomer nozzle 12 and flows into the downcomer 14 where it mixes with the recirculating saturated liquid. A downcomer valve 15 is located upstream of nozzle 12. The combined flows move down the downcomer and enter the tube bundle region 16 at the bottom of the generator. As the fluid rises through the tube bundle 18, it absorbs heat from the primary loop, exiting the bundle region as a two phase fluid. It then flows upward through the riser region 20 to the separators 22. The separators remove the saturated liquid from the steam, returning the liquid to the downcomer 14 and allowing the steam to rise to the dryers 24, before exiting the steam exits the steam generator 10 and enters the main steam line 26.

As is well known in the field of nuclear power, the nuclear reactor (not shown) and the associated piping to and from the steam generator are usually referred to as the primary system, and the reactor vessel and associated piping contain the primary coolant volume. The hot leg of the reactor contains water which has been heated by the reactor and which enters the steam generator through inlet nozzle 30. The steam generator output nozzle 32 returns water from the steam generator through the cold leg piping to the reactor vessel.

The recirculation process which includes the steam generator 10 is sustained by the imbalance in the hydraulic heads of fluid between the downcomer 14 and the tube bundle 18 and riser region 20. During high power operation, the difference in these driving heads is significant and leads to relatively stable operation. As the power is dropped, however, the amount of boiling is reduced in the tube bundle 18, causing a reduction in the quality, i.e., the amount of steam in the mixture flowing through the tube bundle, of the fluid and thus an increase in its density. This in turn reduces the amount of driving head which, in turn, reduces the amount of recirculation. As this occurs, the generator 10 approaches a manometer type condition, where the hydraulic head of the downcomer 14 and the hydraulic head of the riser 20 and tube bundle 18 approach each other. Under these conditions, the downcomer water level becomes very difficult to control.

The normal water level in the steam generator is indicated at 36. The instrumentation for water level measurement is conventional and is indicated in FIG. 1 at 40. Steam flow is measured at, for example, 42.

Feedwater is also and primarily supplied to steam generator 10 through a feedwater nozzle 44 which is connected to an economizer 50. An economizer valve 52 is located upstream of nozzle 44.

A principal objective of the steam generator water level control system is to prevent the water level from rising too high, and causing a high level plant trip, or dropping too low, causing a low level plant trip. The water level is controlled primarily by regulating the feedwater flow through nozzles 12 and 44 through modulation of the settings of valves 15 and 52, and by varying the speed of pumps 54.

Figure 3:
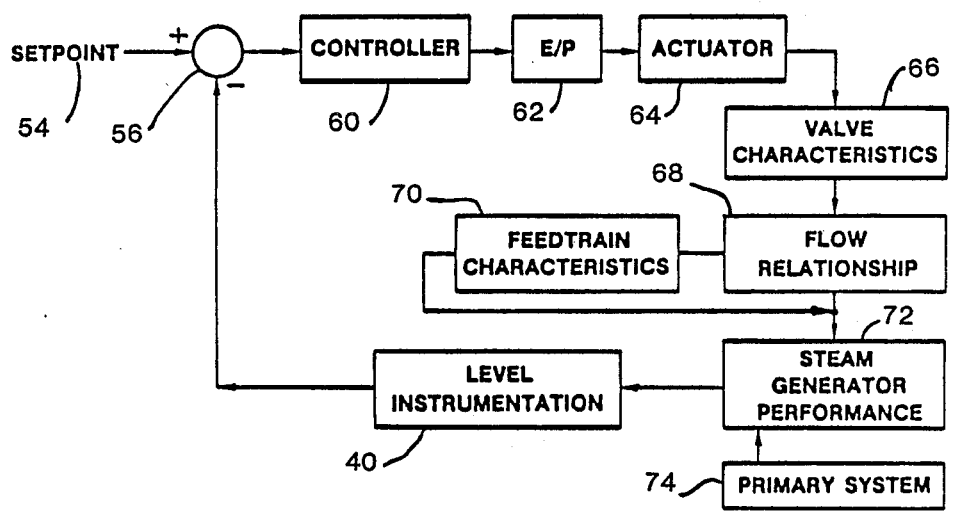
FIG. 3 is a general block diagram of a feedwater flow and steam generator water level control loop.

With reference to FIG. 3, a feedwater flow and steam generator water level control is generally illustrated. A set point 54, representing the desired water level, is a first input to a comparator 56. The difference between the set point and the actual steam generator water level, as provided by level instrumentation 40, is outputted from comparator 56 and fed to a controller 60. Controller 60 generates an electrical control signal which, after suitable processing, to convert the electrical signal into a fluidic signal is delivered to one or more valve actuators 64. Each actuator operates a valve or the like, having characteristics as represented at 66. System operation is also influenced by flow relationships, as represented at 68, and by the feedtrain characteristics, as represented at 70. Both the individual flow relationship 68, as influenced by the valve characteristics, and the feed train characteristics 70 determine the steam generator performance represented at 72. Steam generator performance is also influenced by the operating parameters and design of the primary system 74. The changes in the steam generator performance 72 are measured by the level instrumentation 40 and the signal is returned to the comparator 56 to complete the closed control loop.

Figure 4:
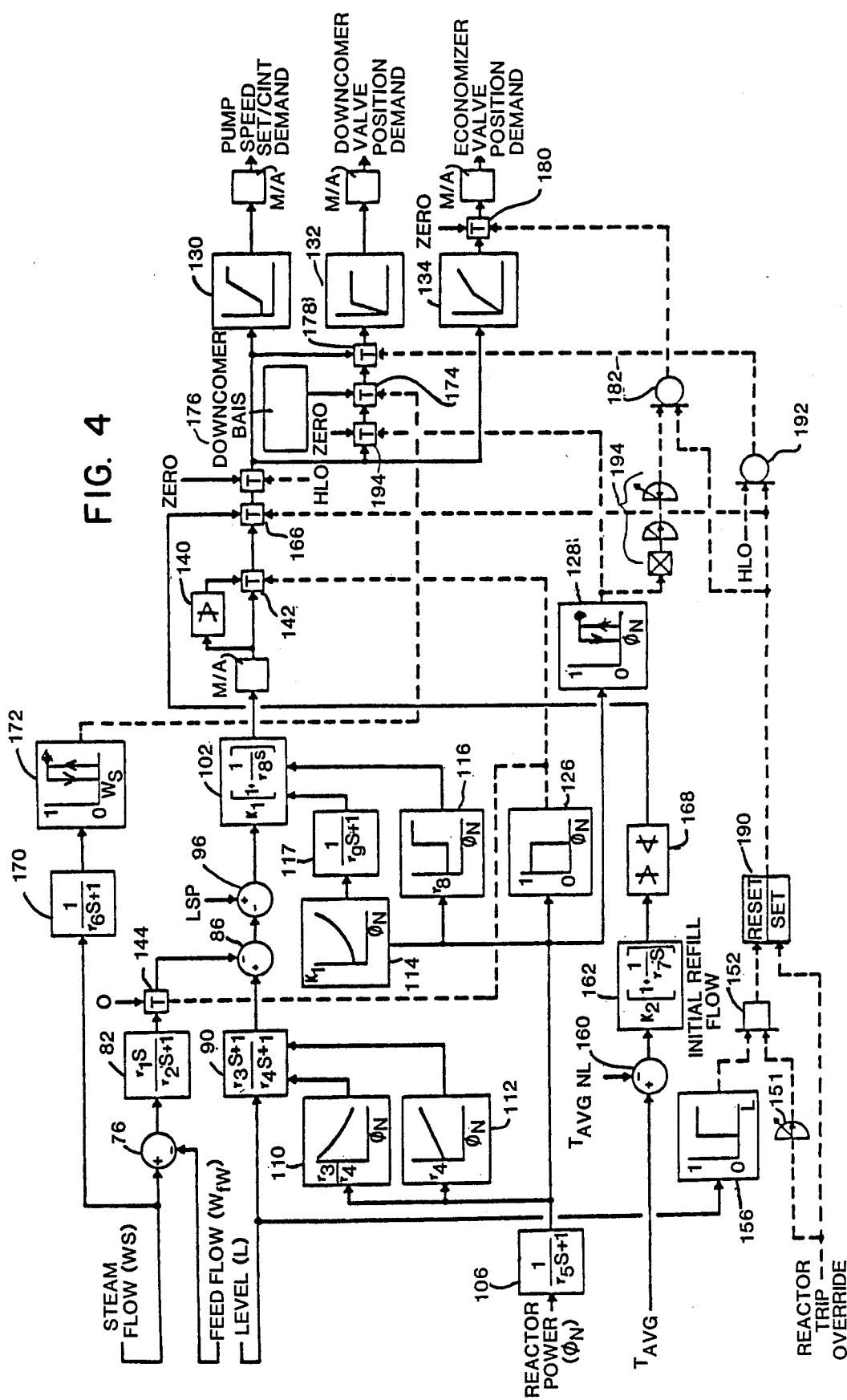
FIG. 4 is a functional diagram illustrating the automatic feedwater control system in accordance with the present invention.

Turning now to FIG. 4, the improved extended range automatic feedwater control system of the present invention will be described in detail. In the following description, it should be appreciated that the invention comprises apparatus and a method for accomplishing novel control techniques. The particular components necessary to implement these techniques are known in the general art of control engineering, but the particular variables used in the control algorithms, and the manner in these variables are employed are novel. Accordingly, where only method steps are described, the associated hardware is either conventionally found in a nuclear power plant, or the selection thereof is self-evident from the function it is to perform.

Three parameter steam generator control is known in the art. The present invention uses the known three parameter controller as the base upon which the present invention is constructed. A comparator 76 receives a steam flow signal WS from the instrument 42 that measures steam flow and a feedwater flow signal. The feedwater flow $W_{fw}$/signal is provided by a flow sensor 77 (FIG. 1) that measures the feedwater flow. The difference between steam and feedwater flow is a mass flow difference signal which is dynamically compensated in a filtered derivative network 82 and the resulting flow error signal is delivered as a bias signal to a comparator 86. Network 82 has a steady state gain equal to zero so that, when the flow difference is not changing, the compensated output signal will be zero and thus will not contribute to the flow demand signal. A signal commensurate with the measured water level L is delivered to an adaptive lead/lag network 90, and the dynamically compensated level signal from network 90 is delivered as the second input to comparator 86. The network 90 gives higher amplification to rapidly changing inputs than to slowly changing inputs and has a steady state gain of unity. The output of comparator 86 is a water level signal biased by the input to output mass flow difference. This biased level signal is delivered as the first input to another comparator 96 where it is compared with a water level set point (LSP). The result of the comparison performed in comparator 96 is a compensated level error signal. This signal has previously been employed as the primary control signal to maintain steam generator water level. While the prior control scheme works reasonably well for relatively high power operation, i.e., above 20% of rated power, the control becomes unreliable as the power level of the NSSS decreases.

In accordance with one aspect of the invention, the lead/lag circuit 90 varies the water level signal L as a function of reactor power level to compensate for dynamic characteristics of the steam generator. The level error signal from comparator 96, i.e., the sum of the compensated mass flow difference and level error signals, is passed through a proportional integral controller 102, where the gain and reset time constant are also adjusted as a function of power to further compensate for the characteristics of the steam generator. The output of controller 102 is a flow demand signal and is the sum of the level error signal plus the integral of the level error signal. Circuit 102 has steady state characteristic such that when the summed error input signal is zero, the controller output signal is constant. A non-zero summed error input signal is integrated causing the output signal to move toward its maximum (for a positive summed error signal) or minimum (for a negative summed error signal) valve. Thus, any level error is forced in steady-state to equal zero.

A signal proportional to nuclear reactor power is filtered in circuit 106. The thus processed power signal is delivered to function generators 110 and 112, where the lag coefficient T4 and the ratio of the lead and lag coefficients T3/T4 is determined as a function of power. The thus determined ratio and lag coefficient are inputted to circuit 90. The filtered power signal is also delivered to function generators 114 and 116 which in turn generate the coefficients T8 and K1 for delivery to the proportional-integral controller 102, the gain control signal K being filtered in circuit 117 before inputting to controller 102. The power adjusted set point for cirucit 90 and controller 102 make it possible to control steam generator level over the full power range by accounting for the non-linear characteristics of the steam generator. The feedflow demand signal from controller 102 is the main signal for establishing the set points for the feedwater pump speed, downcomer valve position, and economizer valve position.

The steam generator water level is thus controlled, as a function of the measured level and reactor power level. The control scheme is further refined by utilizing a logic scheme that depends on where the reactor power lies relative to three power operating regimes, i.e., a low power regime, typically covering the range of about 0-15% of the reactor power, an intermediate power range, preferably in the range of about 15-50% power, and a high power range, preferably in the range of about 50-100% power. The power range determines the combination of feedwater pump speed, downcomer valve position, and economizer valve position utilized to control water level. The reactor power signal from circuit 106 is also delivered to switchover control circuits 126 and 128. In the manner to be described below, the state of switchover control circuits 126 and 128 in part determines the analog input signals to the pump speed and valve position function generators 130, 132, and 134 and also exercises on-off control over the economizer valve position control signal outputted from function generator 134.

It is to be noted that at high power levels the steam flow rate is a reliable measure of power. The steam flow rate signal $W_S$, in addition to delivery to comparator 76, is filtered in circuit 170 and applied to a switch control circuit 172. Control circuit 172 provides a digital control signal for a switching circuit 174 when the system power exceeds a predetermined level. In one reduction to practice, this control level, on rising power, was 55% of rated power. The circuit 172 simulates a hysteresis effect such that the switching control signal is discontinued, on decreasing power, when the power falls below 50% of rated. The presence of the control signal at the output of circuit 172 causes application of a steady state demand signal from downcomer bias signal generator 176 to the input of downcomer valve position demand function generator 132 via switching circuit 178.

From the discussion above, and as will be described in greater detail below, under high power level conditions the downcomer valve will be open but will not be modulated. Also, the economizer valve will be open and modulated. The feedwater pump(s) speed will similarly be modulated. In the intermediate power range, the downcomer valve will be closed and the economizer valve position and pump speed will be modulated. In the low power range, the economizer valve will be closed, the pump speed will be constant and the downcomer valve will be modulated. Closing of the economizer valve during low power operation is achieved by exercising control over a switching circuit 180 to select a "zero" level economizer valve position demand signal when either of the binary inputs to an OR gate 182 are positive. It may thus be seen that the present invention is effectively a single element system at low power levels and a three-element system at high power levels.

It should be noted that the steady state steam generator liquid inventory is greater when feeding the downcomer than when feeding the economizer. For this reason, the switchover control circuit 128 is programmed to provide a hysteresis effect so that there is a delay in the valve action to compensate for the two different inventories. The output of circuit 128 is a digital command signal.

Below a predetermined power level, fifteen (15) percent in one reduction to practice, the steam flow and feed flow signals are unreliable. For this reason, the maximum demand signal provided at the output of controller 102 is limited in circuit 140 when the power level is below the predetermined level. This limiting action is obtained by employing the digital control signal from switchover control circuit 126, which functions as a level detector to control a switching circuit 142. Thus, when the NSSS is operating at less than 15% rated power in the example being discussed, the output of controller 102 will be limited. When the NSSS power is above 15% of rated power, the limiting circuit 140 is bypassed.

Similarly, the output of level detector 126 is used to control a switching circuit 144 so that the steam flow/feed flow bias signal is removed from comparator 86 in the low power operating regime.

Another feature of the invention is the automatic control of refilling the steam generator. After a reactor trip, a tripped override signal will appear, after a delay, at a first input of AND gate 152 and a first input of a trip set/reset circuit 190. If the water level is below a threshold level as established by a level detector 156, the level detector output being delivered as the second input to gate 152, refill of the steam generator is accomplished by a control scheme based on the difference between the average temperature $T_{AVG}$ of the primary loop and a constant commensurate with the average temperature under no load conditions $T_{AVGNL}$. The difference in these temperature signals is generated by a comparator 160 and processed in a proportional/integral controller circuit 162. The output of controller 162 will be a flow demand signal. If this demand signal is between upper and lower limits, as set in a limiting circuit 168, it will be passed to switch 166. The state of switch 166 is controlled by the output of circuit 190 to pass only the limited output of controller 162 until circuit 190 is reset by the change of state of one of the inputs to AND gate 152. The input to gate 152 provided by level detector 156 will, of course, change when the sensed water level exceeds the threshold level. Thus, if the reactor has been tripped and the water level is below normal, the primary loop average water temperature controls the refill rate with the water being supplied via the downcomer valve. Once the water level reaches normal, the control is returned to the automated system described above.

The output of set/reset circuit 190 is also applied as an input to OR gates 182 and 192. Thus, until circuit 190 is reset after having been set in response to a reactor trip, gate 182 will apply a signal to switching circuit 180 which will close the economizer valve. Similarly, gate 192 will apply a signal to switching circuit 178 which will cause the output of controller 162 to be applied to function generator 132.

At power levels in excess of that predetermined as being in the low range, the output of switchover control circuit 128 will operate a switching circuit 194 to cause closing of the downcomer valve until the bias signal from source 176 is applied in the manner described above. The output of circuit 128, after inversion and delay, is applied to OR gate 182 and closes the economizer valve at low power. The delay in opening and closing the economizer valve provides compensation for mass changes.

A high level (HLO) will result in a zero flow demand signal and both the economizer and downcomer valve will be closed. The pump(s) will, however, continue to operate.

The disclosed control provides for operator intervention, M/A, at various points in the system whereby full or partial manual control may be exercised.

It can be appreciated that, in order to implement the control system described above, the dynamic characteristics of the steam generator and other components have to be considered in order to provide appropriate compensation in the various circuits described above. This information can be obtained by analytical studies or field testing, where the steam generator is subjected to primary side perturbations, including steps, ramp and sinusoidal perturbations. The perturbation techniques are intended to characterize the non-linear behavior of the steam generators. The steps and sinusoids provide an indication of increasing responsiveness of the steam generators at low power and also provide an indication of the delays in the system.

Figure 5:
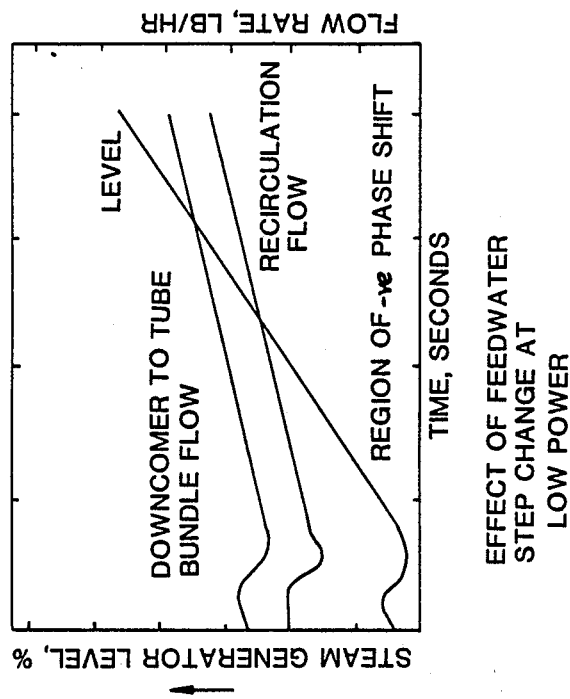
FIG. 5 is a graph showing the effect of feedwater flow change at low power level for a typical steam generator.

FIG. 5 demonstrates some of the steam generator characteristics which adversely affect the controlability of the steam generator water level at low power. The initial influx of feedwater tends to cause a small level rise due to the mass increase in the downcomer. As fluid is accelerated to the tube bundle, because of the increase in the downcomer head, the amount of fluid entering the tube bundle is increased. The net effect is that the steam generator reacts opposite to intuition, at least initially, and has an inherent delay which provides a negative phase shift in an uncompensated control scheme. The present invention takes this phenomena into account.

Figure 6:
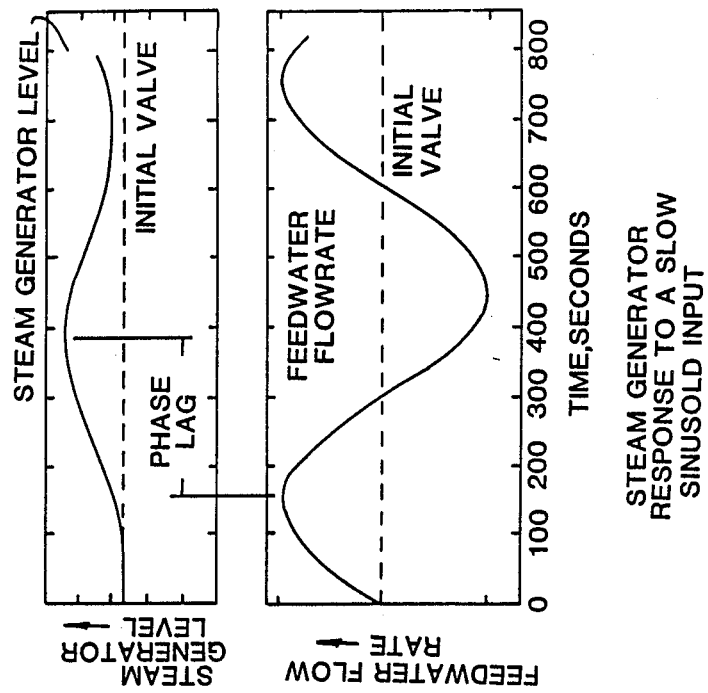
FIG. 6 is a graph showing steam generator response to a slow sinusoid input of the steam generator represented by FIG. 5.

A slow sinusoidal perturbation of feedwater flow rate results in a large phase lag in the steam generator water level response. Thus, as shown in FIG. 6, a relatively slow sinusoidal flowrate perturbation at low powers is manifested by a change in water level delayed by a phase lag approaching 180 degrees, indicating a need for compensation in the controller design. This phonomona is also represented by FIG. 8.

Figure 7:
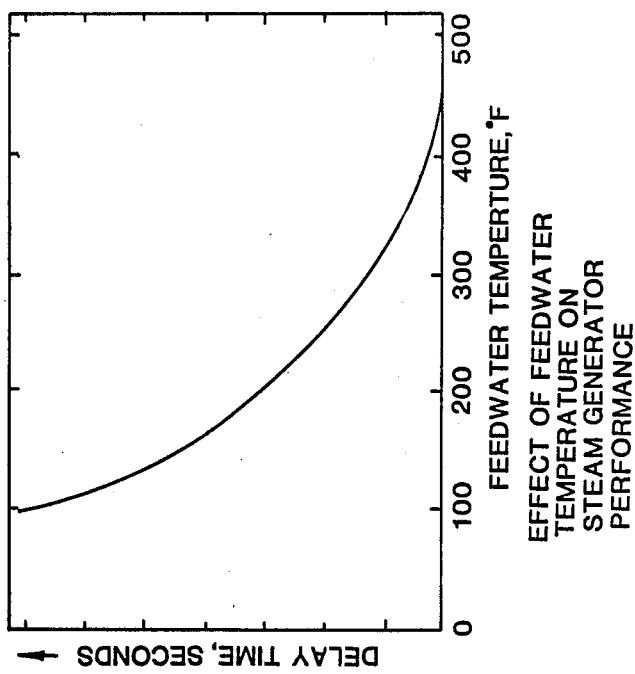
FIG. 7 is a graph illustrating the effect of feedwater temperature on steam generator performance, for the steam generator represented by FIG. 5.

FIG. 7 shows the rapid increase in the delay time (time for level to recover back to the initial level) as feedwater temperature is reduced. Since most pressurized water reactors feed relatively cold water into the steam generator at low powers (before there is adequate steam to bring the main turbine on line) the delay time is large and can lead to an instability if the control system is not designed to compensate for the delay.

Figure 8:
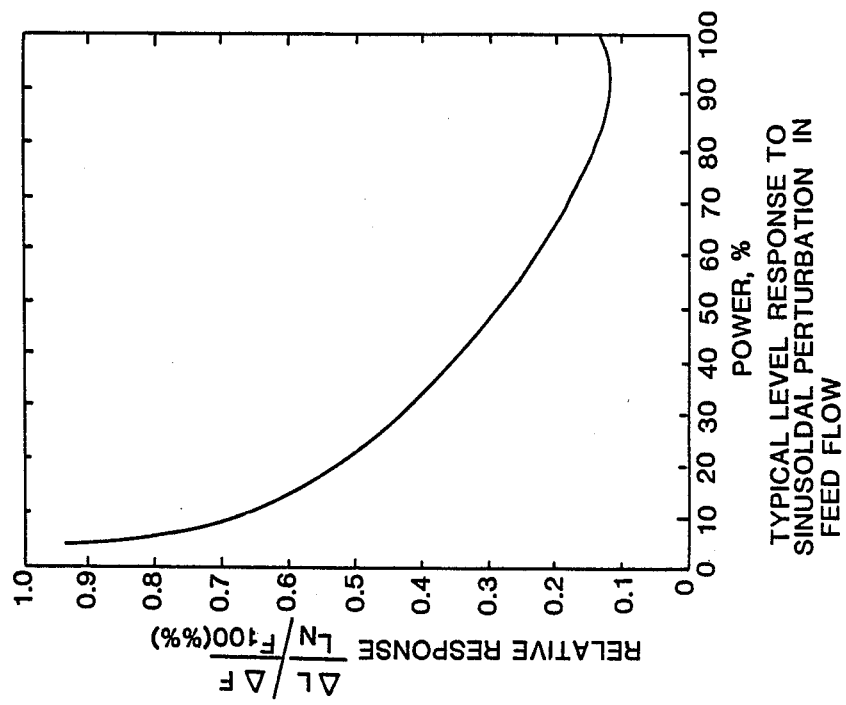
FIG. 8 is a graph showing a typical level response to sinusoidal perturbation in feedflow, for the steam generator represented by FIG. 5.

FIG. 8 shows the process gain increasing at low power. For an optimum control system, variable gain is required to maintain the controller performance without affecting stability. Particularly, gain should be varied to compensate for the steam generator response characteristics, including the response characteristics of components such as valves which affect the feedwater flow in the system. Other considerations which should be taken into account include the downcomer level versus water level relationship and the state of the fluid where the feedwater is being injected into the steam generator.

Of course, the variation of steam generator response as a function of power level is of major importance and the function generators which provide control signals for power level compensation purposes may need to be adjusted during life of the NSSS.

Figure 9:
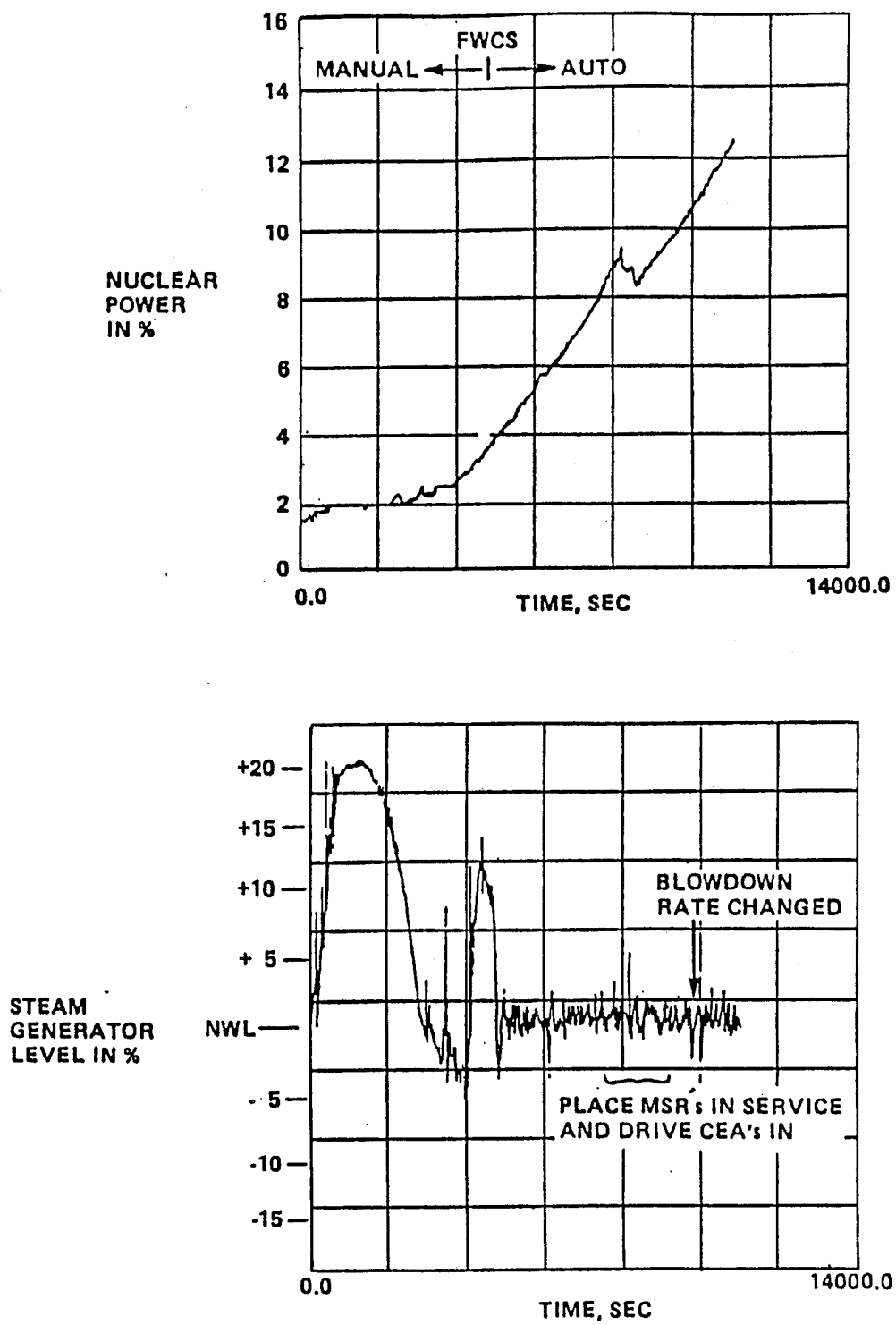
FIG. 9 depicts actual operation of the present invention in the case of a plant startup.

FIG. 9 graphically shows actual startup of a typical NSSS where the thermal power of the system is increased from hot standby to 12%. Initially, steam generator level is maintained manually using an auxiliary feedwater system. At approximately 2% power, feedwater control is manually transferred to the feedwater control system of the present invention. Throughout this period, the steam generator level oscillates as the operator attempts to maintain it. After the system is placed in automatic, at about 3% power, the steam generator level stabilizes at its setpoint. Furthermore, it continues to operate in this stable manner, as power is increased and disturbances are imposed on it due to the placing steam reheater in service, driving control rods and changing blowdown rates.

Figure 10:
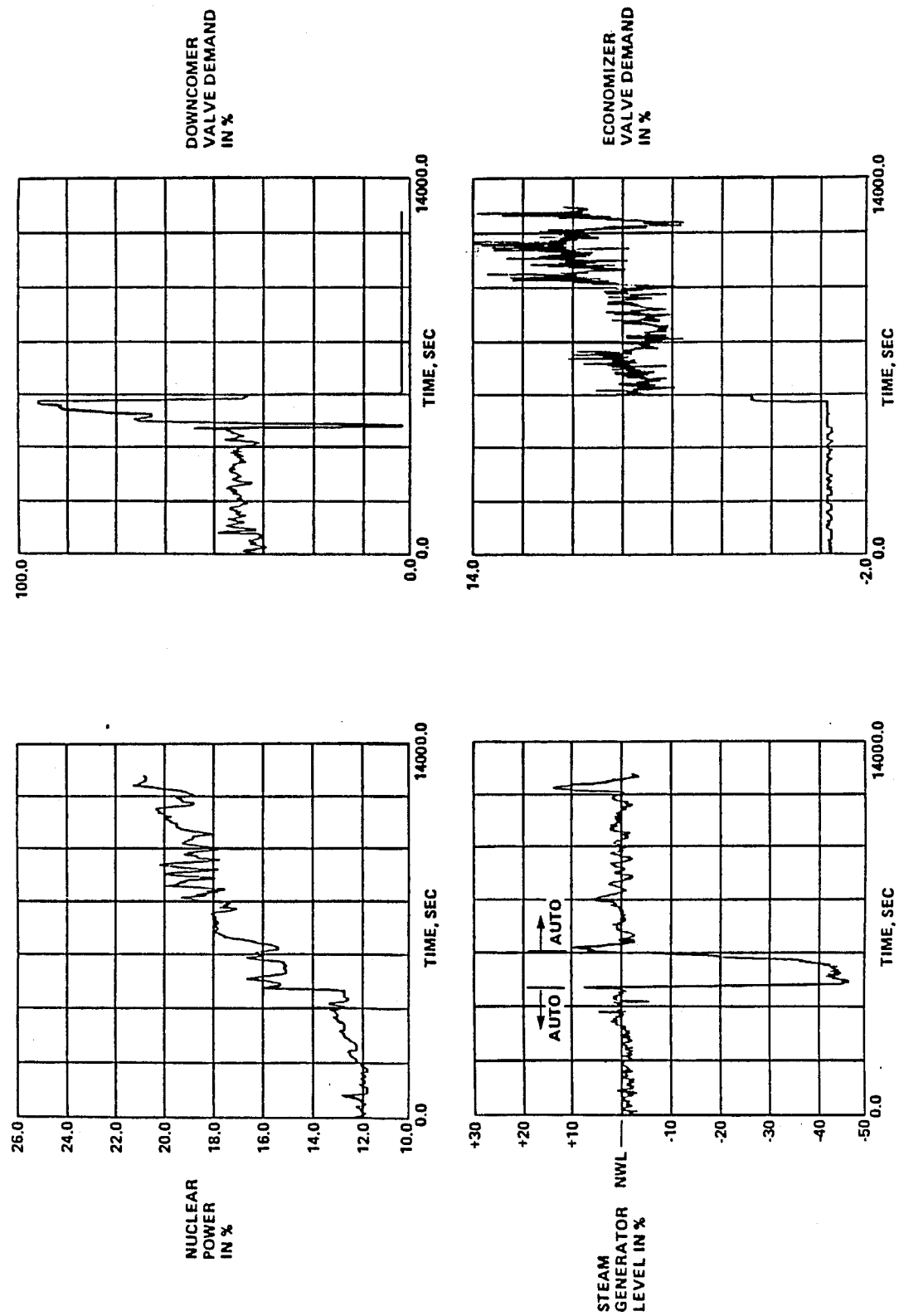
FIG. 10 also depicts actual operation of the present invention.

FIG. 10 demonstrates how maintaining the feedwater system under the automatic control of the present invention can help to avoid a steam generator level trip. In this case, the operator took manual control of the system and closed the downcomer valve on the steam generator without simultaneously opening the economizer valve. As noted above, the downcomer valve is used during low power operation and the economizer valve is used for operation between 15 and 50% power. Since both valves were closed the steam generator water level dropped rapidly. The transient was mitigated by opening both control valves and placing the system in automatic. In this mode the system was again able to maintain steam generator level.

Figure 11:
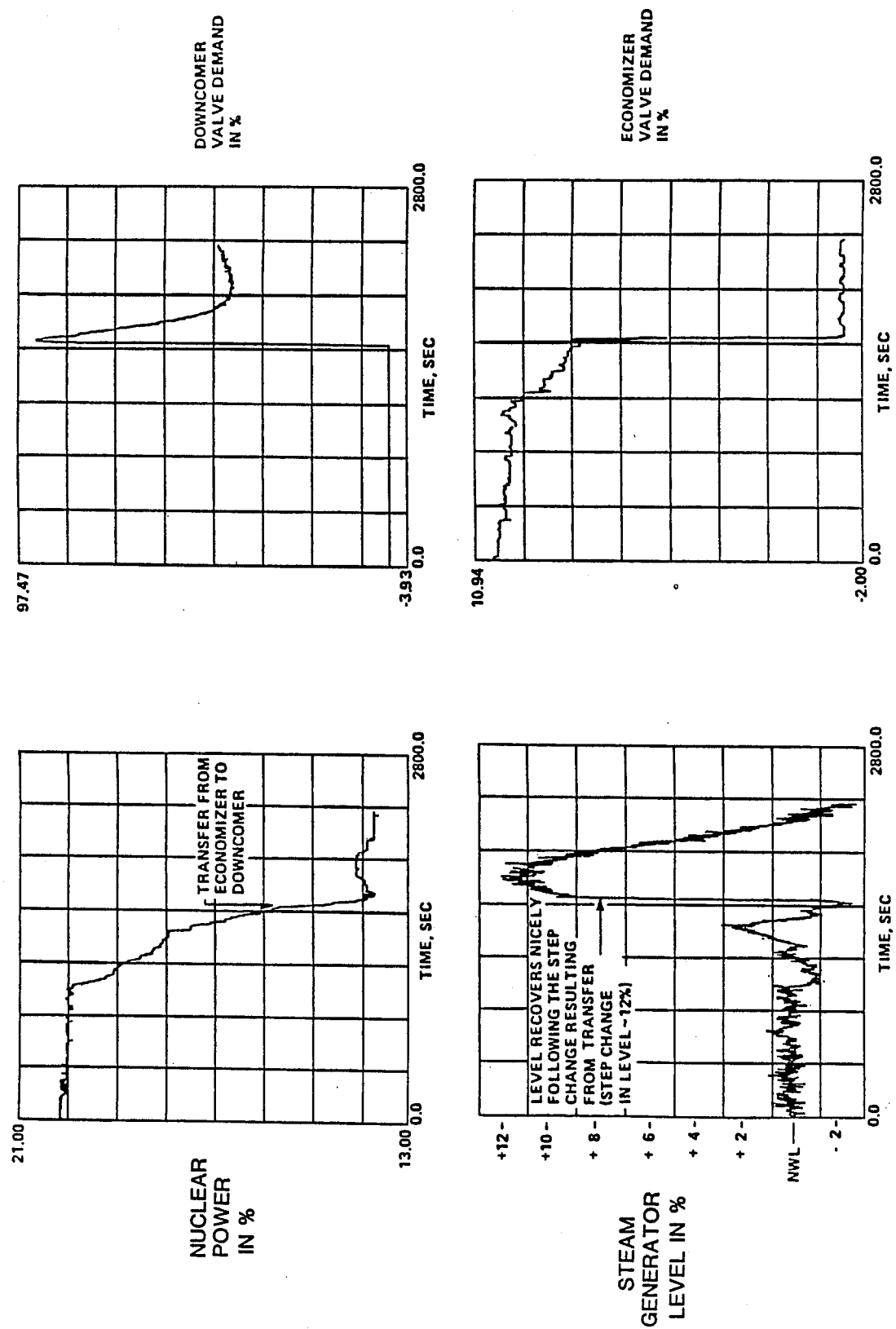
FIG. 11 depicts the ability of the present invention to restore steam generation water level following a large perturbation.

FIG. 11 demonstrates how the present invention is able to restore steam generator water level following a large perturbation. During the transient, feedwater flow is transferred from the economizer valve to the downcomer valve causing the steam generator operating characteristic to change. This causes an initial swell in steam generator level due to the non-equilibrium condition. The feedwater control system limits the overshoot in level and then successfully restores it to its normal setpoint during this low power operation.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In a pressurized water nuclear reactor steam supply system having a recirculation type steam generator including a variable speed feedwater pump, a main feedwater valve and a bypass feedwater valve, a method for controlling the water level in the steam generator comprising:
   measuring the steam flow out of the steam generator and generating a steam flow signal commensurate with the steam flow;
   measuring the feedwater flow into the steam generator and generating a feedwater flow signal commensurate with the feedwater flow;
   measuring the water level in the steam generator and generating a water level signal commensurate with the water level;
   measuring the reactor power and generating a power signal commensurate with the reactor power;
   passing the water level signal through a a first adaptive network, wherein the control coefficients in said first network have a functional form dependent on said power signal, the output of said first network representing a dynamically compensated level signal;
   comprising the steam flow signal with the feedwater flow signal and passing the difference through a first proportional/integral circuit to generate a compensated flow error signal;
   comparing the compensated level signal with the compensated flow error signal to generate a flow demand signal;
   controlling the steam generator water level as a function of said flow demand signal, through a logic scheme including three power regimes corresponding to low, intermediate, and high power levels, wherein,
      the feedwater pump speed demand is constant at low power and is modulated by the flow demand signal at intermediate and high power,
      the bypass valve position is modulated by the flow demand signal at low power, closed at intermediate power and open at high power, and
      the main valve position is closed at low power and modulated by the flow demand signal at intermediate and high power;
   whereby the operation of said feedwater pump, bypass valve and main valve determine the water level in the steam generators during operation of the nuclear steam supply system.

2. The control method of claim 1 wherein the flow demand signal is passed through a second adaptive network in which the control coefficient are functions of said power signal to generate a compensated flow demand signal for delivery to said logic scheme.

3. The control method of claim 1 wherein said system includes a primary side water volume having a hot leg through which water exits the reactor and enters the steam generator and a cold leg through which water exits the steam generator and enters the reactor, further including the steps of
   measuring the average temperature of the primary side water and generating a temperature signal commensurate with the average temperature;
   setting a flat when the reactor has been tripped; and
   refilling the steam generator after a reactor trip to a threshold normal water level by controlling the feedwater flow rate only as a function of the primary side water temperature signal, and after the threshold water level is reached, controlling the feedwater flow rate on said flow demand signal.

4. The control method of claim 1, wherein the step of passing the water level signal through said first adaptive network includes passing the water level signal through a lead/lag circuit.

5. The control method of claim 1, wherein the step of passing the water level signal through a first adaptive network includes passing the signal through a circuit in which at least one of the control coefficients has a nonlinear dependence on said power signal.

6. The control method of claim 4, wherein the flow demand signal is passed through a second proportional integral circuit in which the gain and reset rate are functions of said power signal.

7. The control method of claim 2, wherein the step of passing the flow demand signal through a second adaptive network includes passing the flow demand signal through a second proportional/integral circuit and wherein the gain and reset rate of said second proportional/integral circuit are functions of said power level.

8. The control method of claim 1 wherein each of the feedwater pump, bypass valve, and main valve are modulated by a functional dependence on said flow demand signal.

9. The control method of claim 8, wherein the step of controlling the steam generator water level through a logic scheme includes the step of opening or closing the main valve in accordance with a switchover circuit responsive to said power signal.

10. The control method of claim 9, wherein the step of controlling the steam generator water level through said logic scheme includes the step of closing or opening the bypass valve in accordance with a second switchover circuit responsive to said power signal.

11. The control method of claim 1 further including the step of passing the compensated flow error signal through a switchover circuit responsive to said power signal, wherein the compensated flow error signal is omitted from the step of comparing the compensated level signal with the compensated flow error signal, when the power signal is in said low power regime.

12. The control method of claim 4, wherein the step of passing said water level signal through a first adaptive network includes passing the level signal through a circuit having an output defined by a LaPlace transform that has the form $(T_3S+1)/(T_4S+1)$, and, $T_3$, $T_4$ are the control coefficients that are functions of said power signal.

13. The control method of claim 6, wherein the step of passing the flow demand signal through a second proportional/integral circuit includes passing the flow demand signal through a circuit having an output defined by a LaPlace transform that has the form $K[1+1/T_8S]$, where S is LaPlace's function and K and, $T_8$ are functions of said power signal.

14. The control method of claim 5 wherein the flow demand signal is passed through a second adaptive network comprising a second proportional/integral circuit in which the gain and reset rate are nonlinear functions of said power level, to generate a compensated flow demand signal for delivery to said logic scheme.

15. The control method of claim 14 wherein each of the feed water pump, bypass valve, and main valve are modulated by a functional dependence on said compensated flow demand signal.

16. The control method of claim 15, wherein the step of controlling the steam generator water level through a logic scheme includes the step of opening or closing the main valve in accordance with a switchover circuit responsive to said power signal.

17. The control method of claim 6, wherein the step of controlling the steam generator water level through said logic scheme includes the step of closing or opening the bypass valve in accordance with a second switchover circuit responsive to said power signal.

* * * * *